(12) United States Patent
Kondo

(10) Patent No.: US 6,804,953 B2
(45) Date of Patent: Oct. 19, 2004

(54) AIR-FUEL RATIO CONTROL SYSTEM FOR MULTI-CYLINDER ENGINE

(75) Inventor: Jiro Kondo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/321,432

(22) Filed: Dec. 18, 2002

(65) Prior Publication Data

US 2003/0121250 A1 Jul. 3, 2003

(30) Foreign Application Priority Data

Dec. 27, 2001 (JP) .................................. 2001-397640
Dec. 27, 2001 (JP) .................................. 2001-397823

(51) Int. Cl.⁷ .................................................. F01N 3/00
(52) U.S. Cl. ............................................. 60/285; 60/274
(58) Field of Search .......................... 60/284, 285, 299, 60/274; 123/90.15, 692

(56) References Cited

U.S. PATENT DOCUMENTS

| | | | | |
|---|---|---|---|---|
| 3,708,980 A | * | 1/1973 | Truxell | 60/274 |
| 4,114,374 A | * | 9/1978 | Tanahashi | 60/302 |
| 5,894,726 A | * | 4/1999 | Monnier | 60/274 |
| 5,983,627 A | * | 11/1999 | Asik | 60/274 |
| 6,318,075 B1 | * | 11/2001 | Gunther et al. | 60/285 |
| 6,467,259 B1 | * | 10/2002 | Surnilla et al. | 60/285 |

FOREIGN PATENT DOCUMENTS

| | | |
|---|---|---|
| JP | A-4-41951 | 2/1992 |
| JP | A-8-61052 | 3/1996 |
| JP | A-9-133040 | 5/1997 |

* cited by examiner

*Primary Examiner*—Thomas Denion
*Assistant Examiner*—Diem Tran
(74) *Attorney, Agent, or Firm*—Nixon & Vanderhye P.C.

(57) ABSTRACT

An engine control system has a controller and intake control devices for controlling air amount introduced into each of the cylinders. The controller has a lean burn control block and a warm up control block. Both blocks operate two cylinders under a lean air-fuel ratio, and operate remaining two cylinders under a rich air-fuel ratio. Both blocks control at least the intake control devices to adjust air-fuel ratio.

30 Claims, 5 Drawing Sheets

AIR-FUEL RATIO CONTROL SYSTEM FOR MULTI-CYLINDER ENGINE

CROSS REFERENCE TO RELATED APPLICATION

This application is based on Japanese Patent Applications No. 2001-397640 filed on Dec. 27, 2001 and No. 2001-397823 filed on Dec. 27, 2001 the contents of which are incorporated herein by reference.

BACKGROUND OF THE INVENTION

1. Field of the Invention

The present invention relates to an air-fuel ratio control system for a multi-cylinder engine, more specifically, relates to a system for adjusting an air-fuel ratio of each cylinder by operation of intake control devices disposed on intake passages of cylinders respectively.

2. Description of Related Art

JP-A-9-133040 discloses an engine control system for controlling a temperature of a catalyst for purifying exhaust gas. The system operates at least one of cylinder in the engine under a relatively lean air-fuel ratio, and simultaneously operates the other one of cylinder in the engine under a relatively rich air-fuel ratio. The system performs the afore-mentioned control for speeding a warming up of the catalyst just after the engine has started. The system provides the different air-fuel ratios by adjusting amounts of fuel supply for each cylinder. However, the system still supplies the same amount of air into the cylinders.

JP-A-8-61052 discloses an engine control system for controlling a temperature of a catalyst for purifying exhaust gas too. The system operates at least one of cylinder in the engine under a relatively lean air-fuel ratio, and simultaneously operates the other one of cylinder in the engine under a relatively rich air-fuel ratio too. The system performs the afore-mentioned control at a certain intervals. As a result, the temperature of the catalyst is intermittently and temporally increased and the catalyst is refreshed due to the increased temperature. The system provides the different air-fuel ratios by adjusting amounts of fuel supply for each cylinder. However, the system still supplies the same amount of air into the cylinders.

In case of utilizing a NOx adsorb catalyst, it is needed to deoxidize adsorbed NOx by adjusting the air-fuel ratio rich temporally. For example, the air-fuel ratio for all cylinders is controlled as shown in FIG. 7. The Nox adsorb catalyst is advantageous for an in-cylinder direct injection engine or a lean-burn controlled engine which enables a relatively lean combustion and causes an increase of NOx instead of a decrease of HC and CO as shown in FIG. 8. However, such a NOx reducing method results in a fluctuation of engine output torque in accordance with the air-fuel ratio.

JP-A-4-41951 discloses an engine control system for operating one of cylinder groups under a lean air-fuel ratio. The system discloses a method for providing a lean air-fuel ratio by regulating a fuel amount and a method for providing a lean air-fuel ratio by regulating an air amount. However, the air amount is regulated by a throttle valve commonly disposed for a plurality of cylinders belonging to the cylinder group. Therefore, the plurality of cylinders is operated under the same air amount. In addition, each cylinder group has individual catalyst respectively. Therefore, the one catalyst is supplied with exhaust gas generated by combustions under the same air-fuel ratio. For this reason, the system is not capable of supplying both components originated lean air-fuel ratio and rich air-fuel ratio to the catalyst. Therefore, the system needs to employ additional controls in order reduce emissions.

SUMMARY OF THE INVENTION

It is an object of the present invention to provide an air-fuel ratio control system for a multi-cylinder engine being capable of reducing emissions.

It is another object of the present invention to provide an air-fuel ratio control system for a multi-cylinder engine being capable of speeding the warming up of the catalyst by adjusting an intake air amount for each cylinder.

It is another object of the present invention to provide an air-fuel ratio control system for a multi-cylinder engine being capable of reducing NOx by adjusting an intake air amount for each cylinder.

According to a first aspect of the present invention, an air-fuel ratio control system comprises a first intake control device for controlling an amount of intake air introduced into a first cylinder, and a second intake control device for controlling an amount of intake air introduced into a second cylinder. The system further comprises a controller which controls the first and second intake control devices to operate the first cylinder under a fuel lean air-fuel ratio and to simultaneously operate the second cylinder under a fuel rich air-fuel ratio, when the engine is operated under a predetermined condition. Therefore, it is possible to supply different exhaust gas contents from the first cylinder and the second cylinder. The first cylinder operated under the lean air-fuel ratio emits NOx or O2 more than the second cylinder. On the other hand, the second cylinder operated under the rich air-fuel ratio emits HC and CO more than the first cylinder. Therefore, it is possible to deoxidize NOx by HC and CO. Otherwise, it is possible to make HC and CO to react with O2 and to generate heat.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
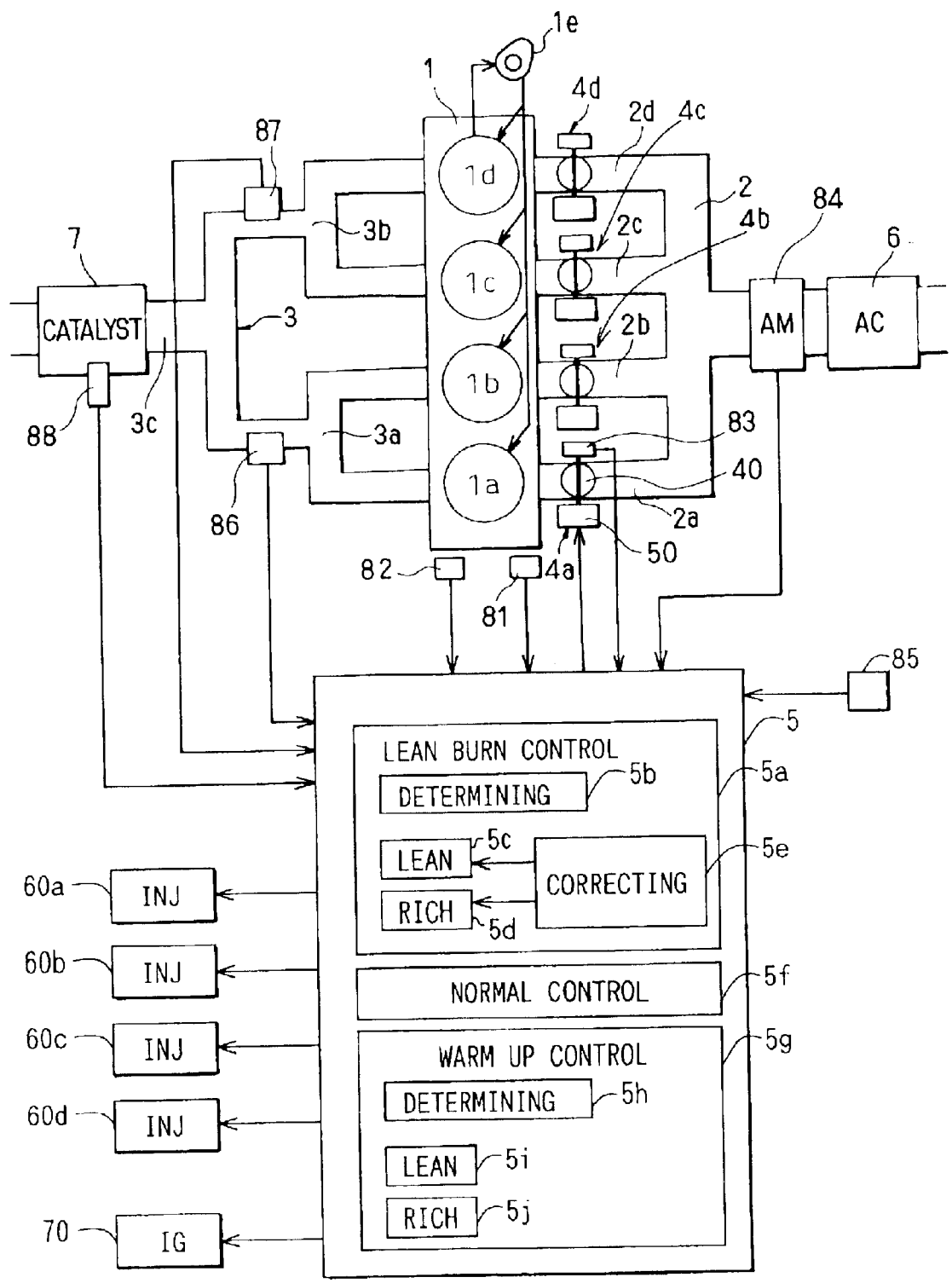
FIG. 1 is a block diagram of a control system of a multi-cylinder engine according to an embodiment of the present invention.

Referring to FIG. 1, an automotive vehicle power system includes an internal combustion engine (engine) and an engine control system.

The engine 1 is a multi-cylinder spark ignition type engine. The engine 1 has four cylinders 1a, 1b, 1c, and 1d. The engine 1 has a cam 1e for operating intake and exhaust valves for the cylinders. The cam 1e is driven by a crankshaft via a drive train such as a belt. The cam 1e has a cam profile that is designed for defining an intake valve operational characteristic which is adequate for high-speed rotation. Such the cam 1e is called as a high-cam or a high-speed adapted cam.

The engine 1 has an intake system 2 and an exhaust system 3. The intake system 2 introduces intake air to the engine 1. The intake system 2 has an intake passage for leading intake air to the cylinders. The intake system 2 has intake manifolds 2a, 2b, 2c, and 2d. Each intake manifold is connected to respective one of the cylinders. Intake control devices 4a, 4b, 4c, 4d are disposed on the intake manifolds 2a, 2b, 2c, 2d respectively. An air cleaner 6 is disposed on an upstream of the intake devices 4a, 4b, 4c, 4d. The intake control devices 4a, 4b, 4c, 4d are the same each other. The intake system 2 has no throttle valve for adjusting an intake airflow amount by restricting cross sectional area of the intake passage. Conventionally, the throttle valve is operated in response to an operation degree of an accelerator pedal. The cylinder 1a and 1b provide a group of the cylinders which may be frequently operated under a fuel lean air-fuel ratio, and are called as lean cylinders. The cylinder 1c and 1d provide a group of the cylinders which may be frequently operated under a fuel rich air-fuel ratio, and are called as rich cylinders. The lean cylinders 1a, 1b and the rich cylinders 1c, 1d can be switched in opposite. In addition, alternatively, only one of the cylinders may be a lean cylinder or a rich cylinder, and remains may be operated as another type of cylinders.

An exhaust system 3 is connected to the engine 1. The exhaust system 3 is arranged in a 4-2-1 arrangement. The exhaust system 3 has an exhaust manifold 3a which is connected to the cylinders 1a and 1b. The exhaust system 3 has an exhaust manifold 3b which is connected to the cylinders 1c and 1d. The exhaust system 3 has a common exhaust passage 3c common for the exhaust manifolds 3a and 3b. Therefore, the exhaust manifold 3a is only connected with the lean cylinders, and the exhaust manifold 3b is only connected with the rich cylinders. A catalyst 7 for purifying exhaust gas is disposed in the common exhaust passage 3c. The catalyst 7 is a three-way catalytic converter for reducing NOx, HC and CO concentrations in the exhaust gas. In the embodiment, no NOx adsorb catalyst is incorporated in the exhaust system 3.

The engine control system has a controller 5. The controller 5 may be referred to as an engine control unit. The controller 5 is constructed as a micro controller having a well known configuration such as a CPU, memory devices, and I/O devices. The engine control system has a plurality of sensors for detecting engine conditions and actuators for adjusting engine operation parameters. The engine control system performs as a lean burn control system for operating the engine 1 under a lean air-fuel ratio when the engine 1 is operated under a predetermined condition.

A crank angle sensor 81 is disposed on the engine 1. The crank angle sensor 81 outputs signal indicative of a rotating angle of a crankshaft of the engine 1 and a rotating speed of the crankshaft. A cylinder identifying sensor 82 is disposed on the engine 1. The cylinder identifying sensor 82 outputs signal when one of pistons of the cylinders 1a, 1b, 1c, 1d is located in a top dead center (TDC). The output signal of the cylinder identifying sensor 82 is used for identifying each of the cylinders. Each intake control device has an opening degree sensor 83. The opening degree sensor 83 outputs signal indicative of an opening degree of an intake control valve 40. The system has four opening degree sensors. An airflow meter 84 is disposed in the intake passage of the intake system 2. The airflow meter 84 detects airflow amount introduced into the cylinders 1a, 1b, 1c, 1d of the engine 1 and outputs signal indicative of an amount of air introduced into the engine 1. An accelerator sensor 85 is disposed on an accelerator pedal. The accelerator sensor 85 outputs signal indicative of an operating degree of the accelerator pedal. A first air-fuel ratio sensor 86 is disposed in the exhaust manifold 3a in which exhaust gas from the lean cylinders 1a and 1b flows. The first air-fuel ratio sensor 86 outputs signal indicative of an air-fuel ratio supplied into the cylinders 1a and 1b. A second air-fuel ratio sensor 87 is disposed in the exhaust manifold 3b in which exhaust gas from the rich cylinders 1c and 1d flows. The second air-fuel ratio sensor 87 outputs signal indicative of an air-fuel ratio supplied into the cylinders 1c and 1d. A temperature sensor 88 is disposed in the catalyst 7. The temperature sensor 88 outputs signal indicative of a temperature of the catalyst 7. The output signals from the sensors are inputted into the controller 5.

Each intake control device has a rotary solenoid actuator 50 for operating the intake control valve 40. The rotary solenoid actuator 50 rotates the intake control valve 40 in accordance with an output signal from the controller 5. The controller 5 controls the opening degree of the intake valve 40 by adjusting the output signal to the rotary solenoid actuator 50 so that an actual opening degree detected by the opening degree sensor 83 approaches and coincides with a target opening degree. The controller has a feedback controlling means for controlling the opening degree of the intake control valve by using the feedback control for each intake control device.

The engine control system further comprises fuel injectors 60a, 60b, 60c, 60d for respective cylinders, and an ignition device 70. The injectors 60a, 60b, 60c, 60d inject fuel into the intake manifolds. The injectors may be in-cylinder direct injectors that inject fuel directly into the cylinders. The controller 5 drives the fuel injectors to control fuel amount. The controller 5 also drives the ignition device to control ignition timing.

Figure 2:
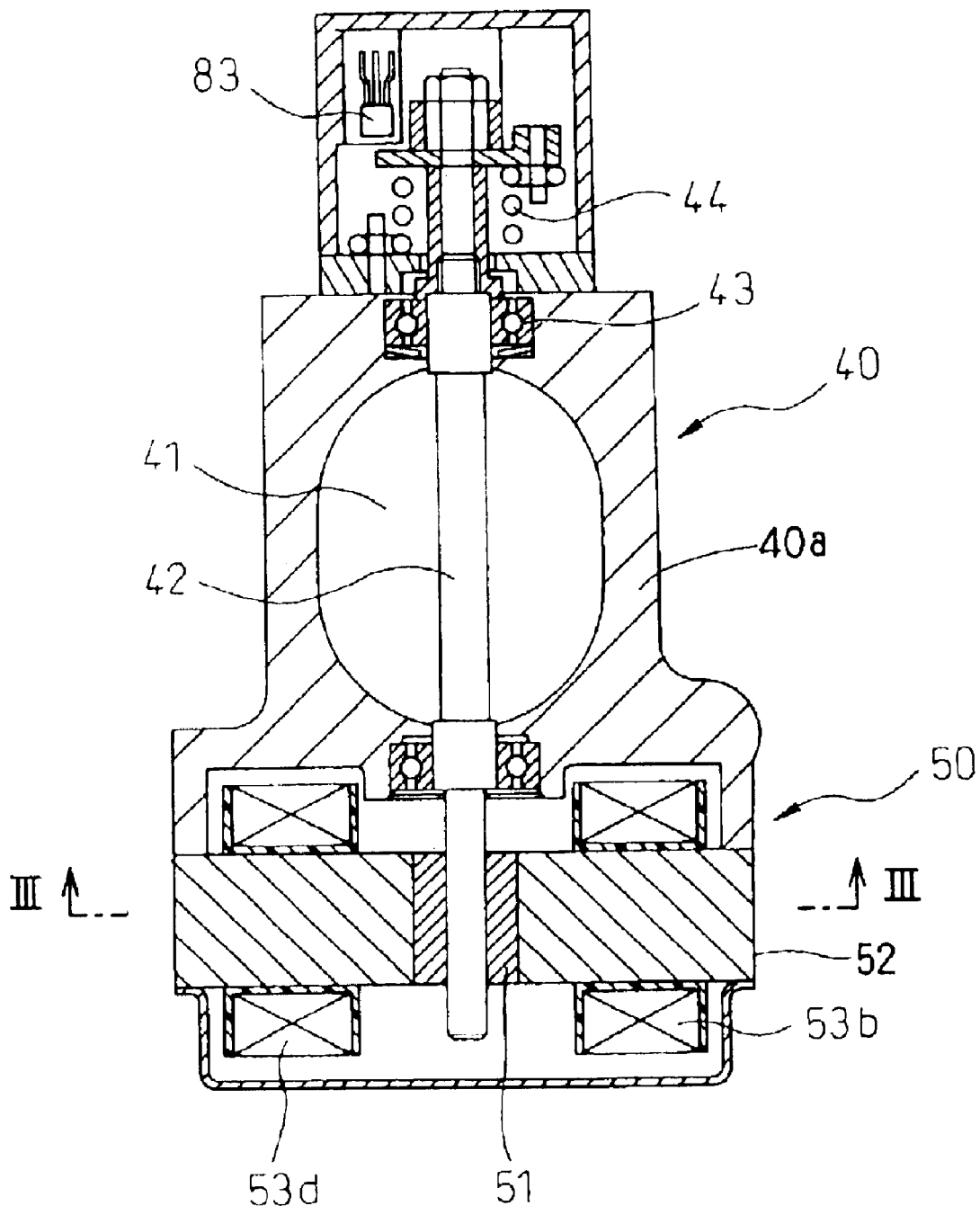
FIG. 2 is a cross sectional view of an intake control valve according to the embodiment of the present invention.
Figure 3:
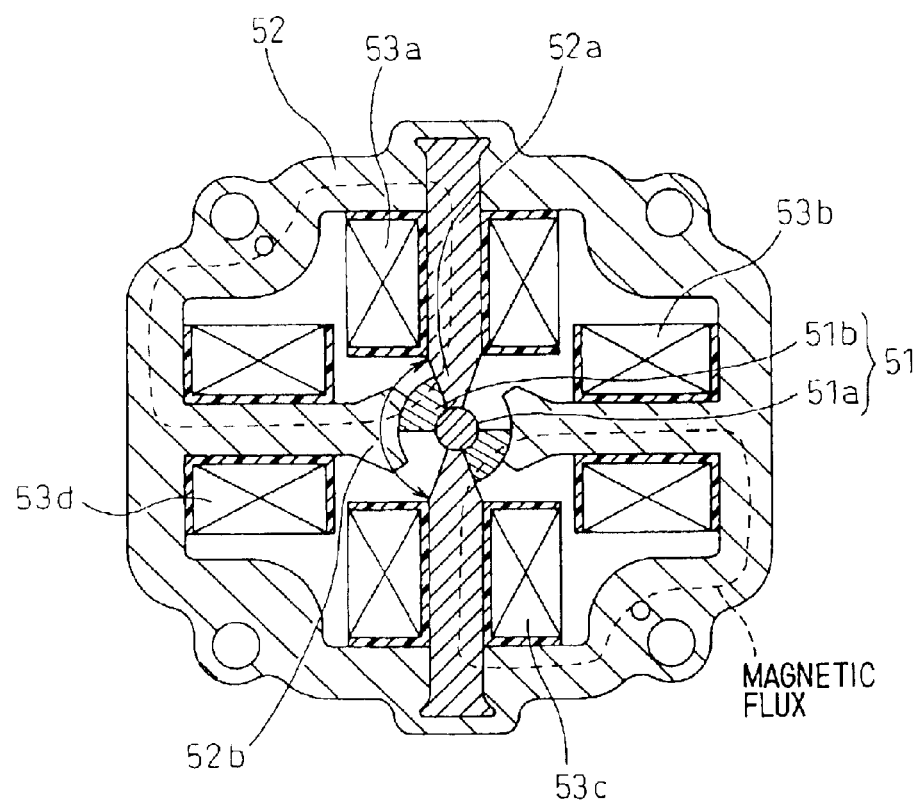
FIG. 3 is a cross sectional view of the intake control valve taken along a line III—III in FIG. 2 according to the embodiment of the present invention.

The intake control device 4a, 4b, 4c, 4d have the same configuration as shown in FIGS. 2 and 3. The intake control device has the intake control valve 40, the rotary solenoid actuator 50 and the opening degree sensor 83. A housing 40a defines a part of the intake manifold and provides an actuator mount and a sensor mount. The intake control valve 40 has a butterfly valve 41 in the intake manifold. The butterfly valve 41 is supported on a shaft 42 which is transversely and rotatably supported on the housing 40a. The shaft 42 is supported by bearings 43. The butterfly valve 41 is a circular plate valve and is rotatably supported. The butterfly valve 41 is capable of varying the cross sectional area of the intake manifold in a fully closed position, a fully opened position and partially opened position.

A first end of the shaft 42 is coupled with a biasing device having a spring 44. The biasing device urges the shaft 42 toward a neutral position in which the butterfly valve 41 opens half of the intake manifold. The first end of the shaft 42 is also coupled with the opening degree sensor 83.

A second end of the shaft 42 is coupled with the rotary solenoid actuator 50. The rotary solenoid actuator 50 rotates the shaft 42 in both directions against the biasing force obtained by the spring 44. The rotary solenoid actuator 50 has a rotor 51 and a stator 52. The rotor 51 is coupled with the shaft 42 to rotate together. The stator 52 is supported on the housing 40a. The rotor 51 has a rotor shaft 51a and fan-shaped portions 51b. The fan-shaped portions 51b are supported on the rotor shaft 51a. The fan-shaped portions 51b extends outwardly in radial directions. The fan-shaped portions 51b provides an ark shaped outer surface for receiving magnetic flux and flat side surfaces for generating attracting force to rotate the rotor 51.

The stator 52 has a stator core and coils 53a, 53b, 53c, 53d. The stator core has a box yoke and radial arms extending inwardly from the box yoke. The radial arms provide a pair of attracting poles 52a and a pair of supplying poles 52b. Each of the attracting poles 52a has a distal end disposed between the fan-shaped portions 51b in a circumferential direction. Therefore, the distal end provides attracting surfaces which face the flat side surfaces of the fan-shaped portions 51b in the circumferential direction. The attracting poles 52b and the fan-shaped portions 51b define circumferential variable gap which is varied in accordance with a rotational position of the rotor 51. The supplying poles 52b always face the outer surfaces of the fan-shaped portions 51b respectively. The rotor 51 and the stator core are made of magnetic material. The rotor 51 and the stator core provide four magnetic paths diagonally arranged around the shaft 51a.

The coils are connected each other so as to excite the diagonally located two of the magnetic paths. For example, when the rotor 51 is rotated in the clockwise direction, the coils 53a, 53b, 53c, 53d are supplied with current in a direction to generate magnetic flux as shown in FIG. 3. When the rotor 51 is rotated in the counter clockwise direction, the coils 53a, 53b, 53c, 53d are supplied with current in the opposite direction.

The rotor 51 rotates in a predetermined angular range which is sufficient to drive the butterfly valve 41 from the fully opened position to the fully closed position. The rotor 51 may be held at any partial opening position between the fully opened position and the fully closed position. For example, when the engine is operated under an idling, the controller 5 controls current supply to the coils so that the butterfly valve 41 is maintained at a position in which an opening degree is very small. The rotor 51 returns to the neutral position when the coils 53a, 53b, 53c, 53d are not excited. This arrangement enables it to improve responsibility of the intake control device.

The rotary solenoid actuator 50 is a high-speed actuator which is capable of driving the intake control valve 40 so as to adjust an period of time for introducing intake air into the cylinder. The intake control device is driven to define a period of time for introducing intake air into the cylinder which is shorter than a fixed period of time for opening the intake valve defined by the cam 1e. For example, the intake control valve 40 is driven with a delayed opening timing, an advanced closing timing or both. The intake control valve 40 may be driven from the fully closed position to the partially opened position or the fully opened position after the intake valve is opened by the cam 1e so as to shorten the period of time for introducing intake air. The intake control valve 40 may be driven from the partially opened position or the fully opened position to the fully closed position before the intake valve is closed by the cam 1e so as to shorten the period of time for introducing intake air. The intake control valve 40 may be driven in both of the delayed opening timing, and an advanced closing timing. In addition to the timing control of the intake control valve 40, the actuator 50 is capable of adjusting the opening degree of the intake control valve 40.

The controller 5 controls the actuator 50 to adjust the opening degree of the intake control valve 40 to a target opening degree in accordance with the signal from the opening degree sensor 83.

The controller 5 basically controls the intake control devices 4a, 4b, 4c, 4d in response to the signal from the sensors such as the accelerator sensor 85 so as to enable the engine 1 to introduce appropriate amount of intake air. In addition to the basic control, the controller 5 drives the intake control valves 4a, 4b, 4c, 4d to implement a lean burn control and a warm up speeding control.

The controller 5 performs as a lean burn control block 5a and a normal control block 5f. The lean burn control block 5a has a determining block 5b which is a means for determining whether or not a lean-burn control is permitted in accordance with the detected conditions of the engine 1. The controller 5 evaluates a load of the engine 1 based on the engine rotating speed and the operating degree of the accelerator pedal. Then, if the load of the engine 1 is in a predetermined range, the controller 5 determines that the lean burn control is permitted. When the lean burn control is permitted, the determining block 5b activates the lean burn control block 5a itself. When the lean burn control is not permitted, the determining block 5b activates the normal control block 5f instead of the lean burn control block 5a.

The lean burn control block 5a is a means for controlling air-fuel ratio supplied to the engine in a fuel lean condition and operating the engine 1 under the fuel lean air-fuel ratio. The lean burn control block 5a has a lean cylinder control block 5c and a rich cylinder control block 5d.

The lean cylinder control block 5c controls air-fuel ratio supplied to the cylinder 1a and 1b in a fuel lean condition. The lean cylinder control block 5c controls at least the intake control devices 4a and 4b so that the air-fuel ratio supplied to the cylinder 1a and 1b become fuel rich value. For instance, the value of the air-fuel ratio is increased. The lean cylinder control block 5c increases opening degree of the intake control devices 4a and 4b to increase air amount during the lean burn control. The lean cylinder control block 5c may extend period of time for opening the intake control devices 4a and 4b to increase air amount. In addition to the control of the intake control devices 4a and 4b, the lean cylinder control block 5c may control the fuel injectors 60a and 60b to adjust the fuel amount so as to operate the engine in an appropriate condition. Further, the lean cylinder control block 5c may control the ignition device 70 so as to operate the engine 1 in an appropriate condition.

The rich cylinder control block 5d controls air-fuel ratio supplied to the cylinder 1c and 1d in a fuel rich condition. The rich cylinder control block 5d controls at least the intake control devices 4c and 4d so that the air-fuel ratio supplied to the cylinder 1c and 1d become fuel rich value. For instance, the value of the air-fuel ratio is decreased. The rich cylinder control block 5d decreases opening degree of the intake control devices 4c and 4d to decrease air amount during the lean burn control. The rich cylinder control block 5d may shorten period of time for opening the intake control devices 4c and 4d to decrease air amount. In addition to the control of the intake control devices 4c and 4d, the rich cylinder control block 5d may control the fuel injectors 60c and 60d to adjust the fuel amount so as to operate the engine 1 in an appropriate condition. Further, the rich cylinder control block 5d may control the ignition device 70 so as to operate the engine 1 in an appropriate condition.

Figure 4:
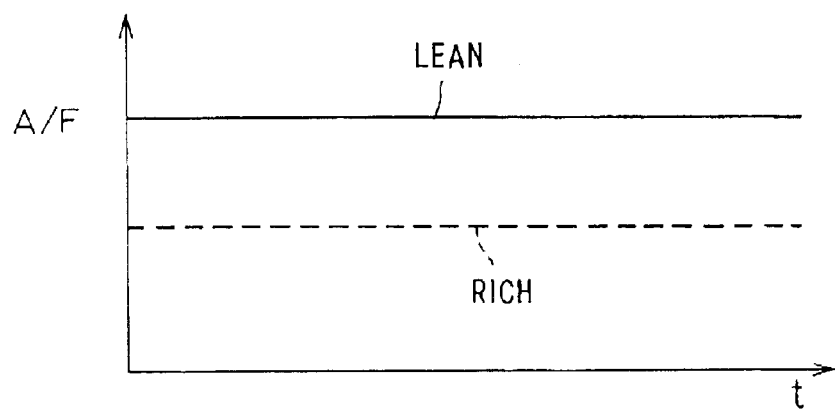
FIG. 4 is a time chart showing air-fuel ratios for different cylinders according to the embodiment of the present invention.

As a result, the lean burn control block 5a supplies relatively fuel leaner air-fuel mixture to the cylinders 1a and 1b than air-fuel mixture supplied to the cylinder 1c and 1d as shown in FIG. 4. The lean cylinder control block 5c and the rich cylinder control block 5d are designed to control an average air-fuel ratio in a fuel lean air-fuel ratio. The average air-fuel ratio is an average of the air-fuel ratios supplied to all of the cylinders 1a, 1b, 1c, 1d. Therefore, on the whole, the engine 1 is operated under the fuel lean air-fuel ratio. The rich air-fuel ratio for the rich cylinders is sufficiently rich to enable the rich cylinders to emit sufficient amount of HC and CO for deoxidizing NOx emitted from the lean cylinders.

The lean cylinder control block 5c performs a feedback control responsive to the signal from the air-fuel ratio sensor 86. The rich cylinder control block 5d performs a feedback control responsive to the signal from the air-fuel ratio sensor 87. Both the lean cylinder control block 5c and the rich cylinder control block 5d are also responsive to the signal from the temperature sensor 88.

The lean burn control block 5a further has a correcting block 5e. The correcting block 5e is a means for correcting the lean cylinder control block 5c and the rich cylinder control block 5d so as to maintain the output torque of the engine 1 in constant. For example, the opening degree of the intake control devices 4a, 4b, 4c, 4d are corrected to suppress fluctuation of the output torque.

The normal control block 5f is a means for controlling air-fuel ratio in a normal condition such as the stoichiometric air-fuel ratio or slightly fuel rich air-fuel ratio.

When the lean burn control is permitted, the engine 1 is operated under both the lean air-fuel ratio and the rich air-fuel ratio. The cylinder 1a and 1b supply exhaust gas which is generated by combustion under the lean air-fuel ratio. The cylinder 1c and 1d supply exhaust gas which is generated by combustion under the rich air-fuel ratio. Therefore, NOx from the cylinder 1a and 1b may be deoxidized with HC and CO from the cylinder 1c and 1d. The deoxidization may be carried out at the catalyst 7. The deoxidization is continuously carried out during the lean burn control.

It is possible to reduce NOx during the lean burn control without NOx adsorb catalyst. It is also possible to avoid torque shock due to an abrupt change of air-fuel ratio. In addition, since the NOx adsorb catalyst is expansive, it is possible to reduce the cost.

The controller 5 further has a warm up control block 5g. The warm up control block 5g is a warm up speeding means for speeding warming up of the catalyst 7 when the engine 1 is started from cold condition. The warm up control block 5g has a warm up determining block 5h, a lean cylinder control block 5i and a rich cylinder control block 5j.

The warm up determining block 5h works as a warm up determining means for determining whether or not a warming up speeding control is required based on the detected condition of the engine 1. When the engine 1 is started after completely cooled or at a cold ambient condition, and the temperature of the catalyst 7 is lower than a predetermined temperature, the warm up determining block 5h determines that the warming up speeding control is required. The warm up determining block 5h activates the lean cylinder control block 5i and the rich cylinder control block 5j.

The lean cylinder control block 5i controls air-fuel ratio supplied to the cylinder 1a and 1b in a fuel lean condition. The lean cylinder control block 5i is similar to the lean cylinder control block 5c in the lean burn control block 5a. The rich cylinder control block 5j controls air-fuel ratio supplied to the cylinder 1c and 1d in a fuel rich condition. The rich cylinder control block 5j is similar to the lean cylinder control block 5d in the lean burn control block 5a. The rich air-fuel ratio supplied to the rich cylinders is sufficiently rich to enable the rich cylinders to emit sufficient amount of HC and CO for reacting with O2 emitted from the lean cylinders to heat a device in the exhaust system 3, such as the catalyst 7.

The lean cylinder control block 5i and the rich cylinder control block 5j are designed to control the intake control devices 4a, 4b, 4c, 4d to suppress fluctuation of the output torque of the engine 1 and to maintain an average output torque of the engine in constant.

During the warm up speeding control, exhaust gas from the rich cylinders 1c and 1d contains relatively higher concentration of HC and CO. Meanwhile, exhaust gas from the lean cylinders 1a and 1b contains relatively higher concentration of O2. The contents of HC and CO from the rich cylinders 1c and 1d and the content of O2 from the lean cylinders 1a and 1b react at the catalyst 7. The reaction generates heat that helps warming up the catalyst 7. As a result, the temperature of the catalyst 7 can be increased early.

Figure 5:
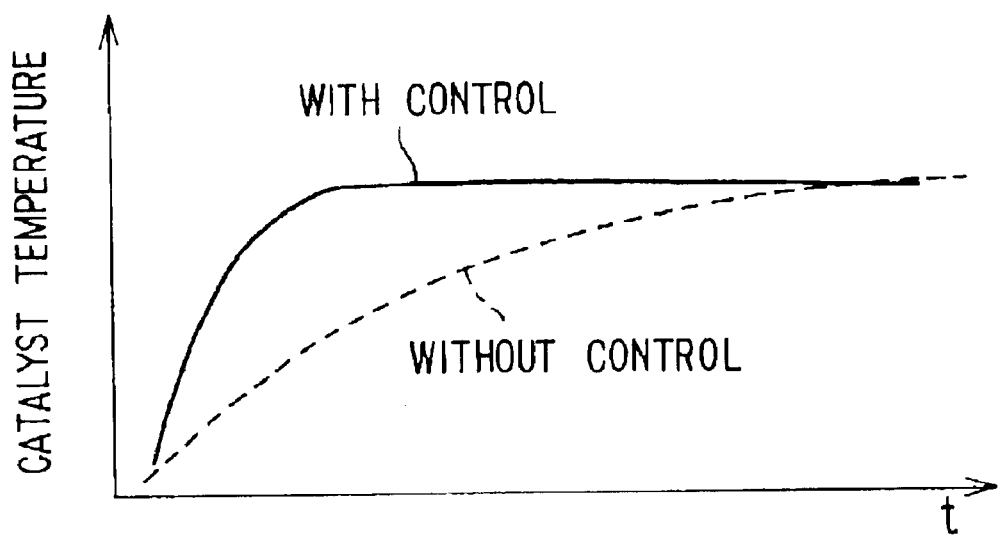
FIG. 5 is a time chart showing temperature of a catalyst according to the embodiment of the present invention.
Figure 6:
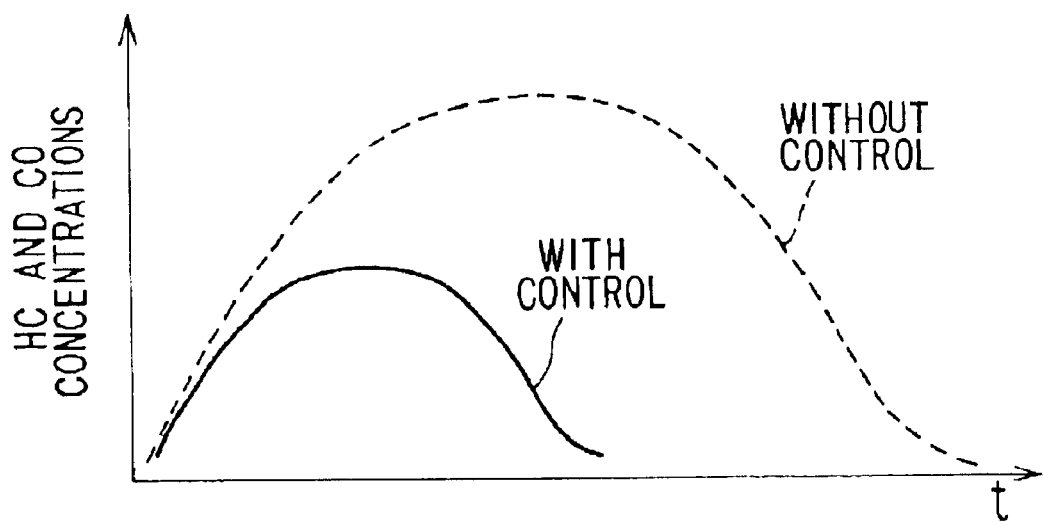
FIG. 6 is a time chart showing concentration of HC and CO in exhaust gas according to the embodiment of the present invention.
Figure 7:
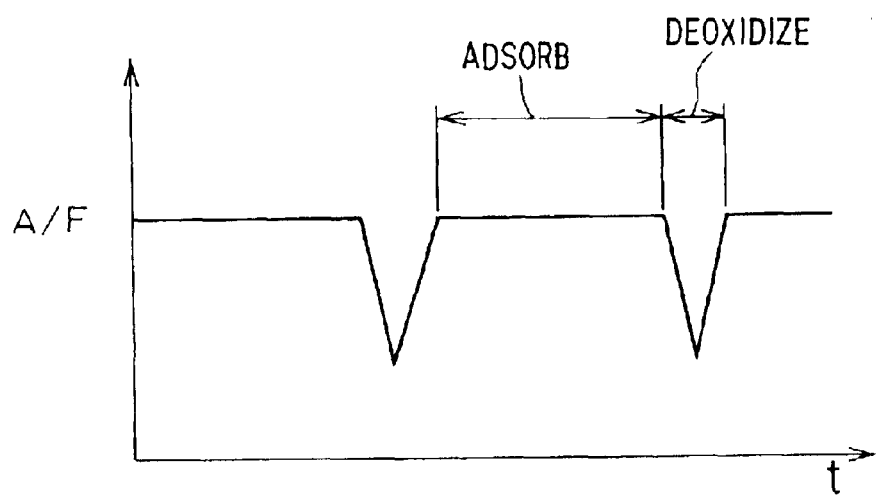
FIG. 7 is a time chart showing air-fuel ratio according to a related art.
Figure 8:
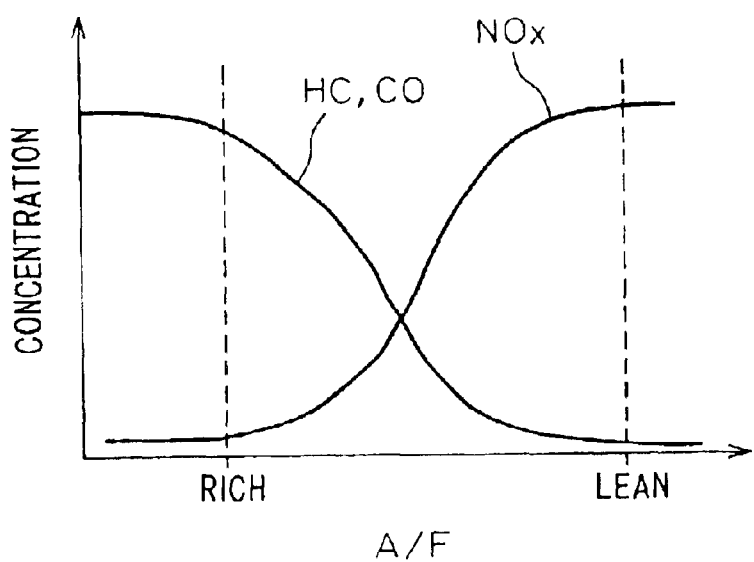
FIG. 8 is a graph showing concentration of NOx, HC, and CO versus air-fuel ratio according to the related art.

Referring to FIGS. 5 and 6, solid lines indicate the embodiment having the warm up speeding control, broken lines indicate a comparative embodiment having no warm up speeding control. According to the embodiment, it is possible to warm up the catalyst 7 rapidly. In addition, it is possible to reduce emissions of HC and CO contents in the exhaust gas.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An air-fuel ratio control system for multi-cylinder engine having a first cylinder, a second cylinder, and an exhaust passage in which exhaust gas from both the first and second cylinders flows, the system comprising:
   a first intake control device for controlling an amount of intake air introduced into the first cylinder;
   a second intake control device for controlling an amount of intake air introduced into the second cylinder; and
   a controller which controls the first and second intake control devices to operate the first cylinder under a fuel lean air-fuel ratio and to simultaneously operate the second cylinder under a fuel rich air-fuel ratio, when the engine is operated under a predetermined condition;
   each of the first intake control device and the second intake control device having an intake valve and an actuator driving the intake valve in a partially opened position when the actuator is not excited.

2. The air-fuel ratio control system according to claim 1, further comprising a catalyst disposed in the exhaust passage, for purifying the exhaust gas.

3. The air-fuel ratio control system according to claim 1, wherein the controller includes:
   lean control means for controlling an air-fuel ratio supplied to the first cylinder in a fuel lean air-fuel ratio by adjusting the first intake control device;
   rich control means for controlling an air-fuel ratio supplied to the second cylinder in a fuel rich air-fuel ratio by adjusting the second intake control device; and
   activating means for activating the lean control means and the rich control means simultaneously when the engine is operated under the predetermined condition.

4. The air-fuel ratio control system according to claim 3, further comprising:
- a first air-fuel ratio sensor which outputs signal indicative of the air-fuel ratio supplied to the first cylinder; and
- a second air-fuel ratio sensor which outputs signal indicative of the air-fuel ratio supplied to the second cylinder, wherein
- the lean control means is responsive to the signal from the first air-fuel ratio sensor, and
- the rich control means is responsive to the signal from the second air-fuel ratio sensor.

5. The air-fuel ratio control system according to claim 1, wherein each of the actuators drives a respective one of the intake control valves so as to adjust an period of time for introducing intake air into the cylinder.

6. The air-flow ratio control system according to claim 5, wherein each of the first and second intake control devices is driven to define the period of time for introducing intake air into the cylinder which is shorter than a fixed period of time for opening an intake valve defined by a cam of the engine.

7. The air-flow ratio control system according to claim 5, wherein each of the first and second intake control devices further has an opening degree sensor which outputs signal indicative of an opening degree of the intake control valve, and the controller controls the actuator to adjust the opening degree of the intake control valve to a target opening degree in accordance with the signal from the opening degree sensor.

8. The air-fuel ratio control system according to claim 7, wherein the cam has a cam profile adapted for a high speed range of the engine speed.

9. The air-fuel ratio control system according to claim 1, wherein the predetermined condition includes a condition in which the engine is permitted to be operated under a lean burn control.

10. The air-fuel ratio control system according to claim 9, wherein the controller controls the second intake control device to operate the second cylinder under the fuel rich air-fuel ratio which is sufficiently rich to enable the second cylinder to emit sufficient amount of HC and CO for deoxidizing NOx emitted from the first cylinder.

11. The air-fuel ratio control system according to claim 1, wherein the predetermined condition includes a condition in which a warming up speeding control is required.

12. The air-fuel ratio control system according to claim 11, wherein the controller controls the second intake control device to operate the second cylinder under the fuel rich air-fuel ratio which is sufficiently rich to enable the second cylinder to emit sufficient amount of HC and CO for reacting with O2 emitted from the first cylinder to heat a device in an exhaust system of the engine.

13. The air-fuel ratio control system according to claim 11, wherein the predetermined condition further includes a condition in which the engine is permitted to be operated under a lean burn control.

14. The air-fuel ratio control system according to claim 1, wherein each of the actuators of the first and second control devices is a solenoid actuator, and each of the intake valves of the first and second intake control devices is in the partially opened position when a respective one of the solenoid actuators of the first and second control devices is not electrically excited.

15. The air-fuel ratio control system according to claim 1, wherein each of the actuators of the first and second intake control devices includes a spring for biasing the intake valve into the partially opened position.

16. A method of controlling an air-fuel ratio in a multi-cylinder engine having a first cylinder, a second cylinder, and an exhaust passage in which exhaust gas from both the first and second cylinders flows, the method comprising:
- controlling an amount of intake air introduced into the first cylinder via a first intake control device having an intake valve and an actuator;
- controlling an amount of intake air introduced into the second cylinder via a second intake control device having an intake valve and an actuator; and
- controlling the first and second intake control devices to operate the first cylinder under a fuel lean air-fuel ratio and to simultaneously operate the second cylinder under a fuel rich air-fuel ratio, when the engine is operated under a predetermined condition; and
- controlling the first and second intake control devices so that the intake valve of the first intake control device is in a partially opened position when the actuator of the first intake control device is not excited and the intake valve of the second intake control device is in a partially opened position when the actuator of the second intake control device is not excited.

17. The method according to claim 16, further comprising disposing a catalyst in the exhaust passage for purifying the exhaust gas.

18. The method according to claim 16, wherein the controller includes:
- controlling an air-fuel ratio supplied to the first cylinder in a fuel lean air-fuel ratio by adjusting the first intake control device;
- controlling an air-fuel ratio supplied to the second cylinder in a fuel rich air-fuel ratio by adjusting the second intake control device; and
- activating control of the air fuel ratios supplied to the first and second cylinders simultaneously when the engine is operated under the predetermined condition.

19. The method according to claim 18, further comprising:
- outputting a signal indicative of the air-fuel ratio supplied to the first cylinder from a first air-fuel ratio sensor; and
- outputting a signal indicative of the air-fuel ratio supplied to the second cylinder from a second air-fuel ratio sensor, wherein
- the control of the air-fuel ratio supplied to the first cylinder is responsive to the signal from the first air-fuel ratio sensor, and
- the control of the air-fuel ratio supplied to the second cylinder is responsive to the signal from the second air-fuel ratio sensor.

20. The method according to claim 16, wherein the actuator of each of the first and second intake control device drives the intake control valve of that control device so as to adjust an period of time for introducing intake air into a respective one of the first and second cylinders.

21. The method according to claim 20, wherein each of the first and second intake control devices is driven to define the period of time for introducing intake air into respective ones of the first and second cylinders which is shorter than a fixed period of time for opening an intake valve defined by a cam of the engine.

22. The method according to claim 20, wherein each of the first and second intake control devices further has an opening degree sensor which outputs signal indicative of an opening degree of the intake control valve, and the actuator is controlled to adjust the opening degree of the intake control valve to a target opening degree in accordance with the signal from the opening degree sensor.

23. The method according to claim 22, wherein the cam has a cam profile adapted for a high speed range of the engine speed.

24. The method according to claim 16, wherein the predetermined condition includes a condition in which the engine is permitted to be operated under a lean burn control.

25. The method according to claim 24, wherein the second intake control device is controlled to operate the second cylinder under the fuel rich air-fuel ratio which is sufficiently rich to enable the second cylinder to emit sufficient amount of HC and CO for deoxidizing NOx emitted from the first cylinder.

26. The method according to claim 16, wherein the predetermined condition includes a condition in which a warming up speeding control is required.

27. The method according to claim 26, wherein the second intake control device is controlled to operate the second cylinder under the fuel rich air-fuel ratio which is sufficiently rich to enable the second cylinder to emit sufficient amount of HC and CO for reacting with O2 emitted from the first cylinder to heat a device in an exhaust system of the engine.

28. The method according to claim 26, wherein the predetermined condition further includes a condition in which the engine is permitted to be operated under a lean burn control.

29. The method according to claim 16, wherein each of the actuators of the first and second intake control devices is a solenoid actuator, and each of the intake valves of the first and second intake control devices is in the partially opened position when a respective one of the solenoid actuators of the first and second intake control devices is not electrically excited.

30. The method according to claim 16, wherein each of the actuators of the first and second intake control devices includes a spring for biasing the intake valve into the partially opened position.

* * * * *